July 10, 1928.

B. M. W. HANSON

GRINDING MACHINE

Filed Feb. 9, 1924

Inventor

Bengt M. W. Hanson

By his Attorney

July 10, 1928. 1,676,643

B. M. W. HANSON

GRINDING MACHINE

Filed Feb. 9, 1924 5 Sheets-Sheet 3

Inventor
Bengt M. W. Hanson
By H. Clay Lindsey
His Attorney

July 10, 1928.  
B. M. W. HANSON  
1,676,643  
GRINDING MACHINE  
Filed Feb. 9, 1924   5 Sheets-Sheet 5

Inventor  
Bengt M. W. Hanson  
By T. Clay Lindsey  
His Attorney

Patented July 10, 1928.

1,676,643

UNITED STATES PATENT OFFICE.

BENGT M. W. HANSON, OF HARTFORD, CONNECTICUT; EINAR A. HANSON AND CLARENCE E. WHITNEY EXECUTORS OF SAID BENGT M. W. HANSON, DECEASED.

GRINDING MACHINE.

Application filed February 9, 1924. Serial No. 691,643.

This invention relates to improvements in a machine for grinding threaded members, such as thread gauges, taps, screws, and the like, and has as its object to provide a machine of this sort having various features of novelty and advantage.

The aim of the invention is to provide a machine for griding threaded members which is characterized by its efficiency in operation in that it will turn out threaded members with extreme accuracy and with considerable rapidity.

More particularly, an object of the invention is to make certain changes or improvements in the machine illustrated, described and claimed in my co-pending application, Serial No. 334,952, filed November 1st, 1919, and which machine is there shown, by way of illustration, as including a grinding wheel having a single cutting edge, a work holder mounted for rocking movement towards and away from the griding wheel, a lead screw for reciprocating the work holder axially of the work, a cam for lifting or withdrawing the work holder so that the work will clear the griding wheel on the reverse stroke of the work holder, and mechanism for feeding the work relative to the grinding wheel so that the latter will take successive cuts in the work, the various instrumentalities being so connected up that they operate in proper timed relation to one another. In the machine of said application, the work spindle and the lead screw, which are geared together, are rotated in one direction during the cutting operation so that the wheel will grind successive convolutions of the work throughout the length of the thread and upon the return or inoperative stroke of the work holder the direction of rotation of the lead screw and work spindle is reversed. Each time the work is moved on its operative stroke, the grinding wheel will take a slightly deeper cut until the thread is of the desired size and shape.

In accordance with the present invention, I provide the machine with a grinding wheel provided with a plurality of circumferential cutting edges or ribs suitably spaced apart in accordance with the pitch of the thread on the work, whereby a plurality of convolutions of the thread to be operated upon are simultaneously ground to the exact size and dimension. Means is provided for repeatedly effecting a back and forth movement between the grinding wheel and work axially of the latter in accordance with the pitch of the thread and, preferably, through a distance less than the effective grinding length of the wheel, and a relative intermittent feeding movement of the wheel and work towards each other is effected so that new cuts will be taken on the work each time the wheel and work are relatively moved longitudinally. With my improved arrangement, the time required for grinding a thread to the proper size is greatly reduced, the productivity and accuracy of the machine are increased, and threaded members may be ground at a relatively lower cost and with extreme precision.

In the present illustrative disclosure of the invention, the machine is provided with a cam S for the purpose of moving the work in accordance with the pitch of the thread to be ground. This cam S is connected up to the work spindle and so constructed that, upon one complete revolution, it will move the work through one cycle, that is, will move the work on its operative stroke, and then on its return stroke to its original position, and during this time the work spindle is rotating more than one revolution. Associated with this cam S is a second cam R which controls the intermittent feeding movement of the work towards the wheel and the movement of the work away from the wheel on the return stroke of the former. The movements of the parts are controlled with great nicety, and backlash, with its attendant errors, is substantially eliminated.

Other objects will be in part obvious and in part pointed out more in detail hereinafter.

The invention accordingly consists in the features of construction, combination of elements and arrangement of parts which will be exemplified in the construction hereinafter set forth, and the scope of the application of which will be indicated in the appended claims.

In the accompanying drawings, wherein I have shown, for illustrative purposes, one embodiment which the present invention may take:

Figure 1:
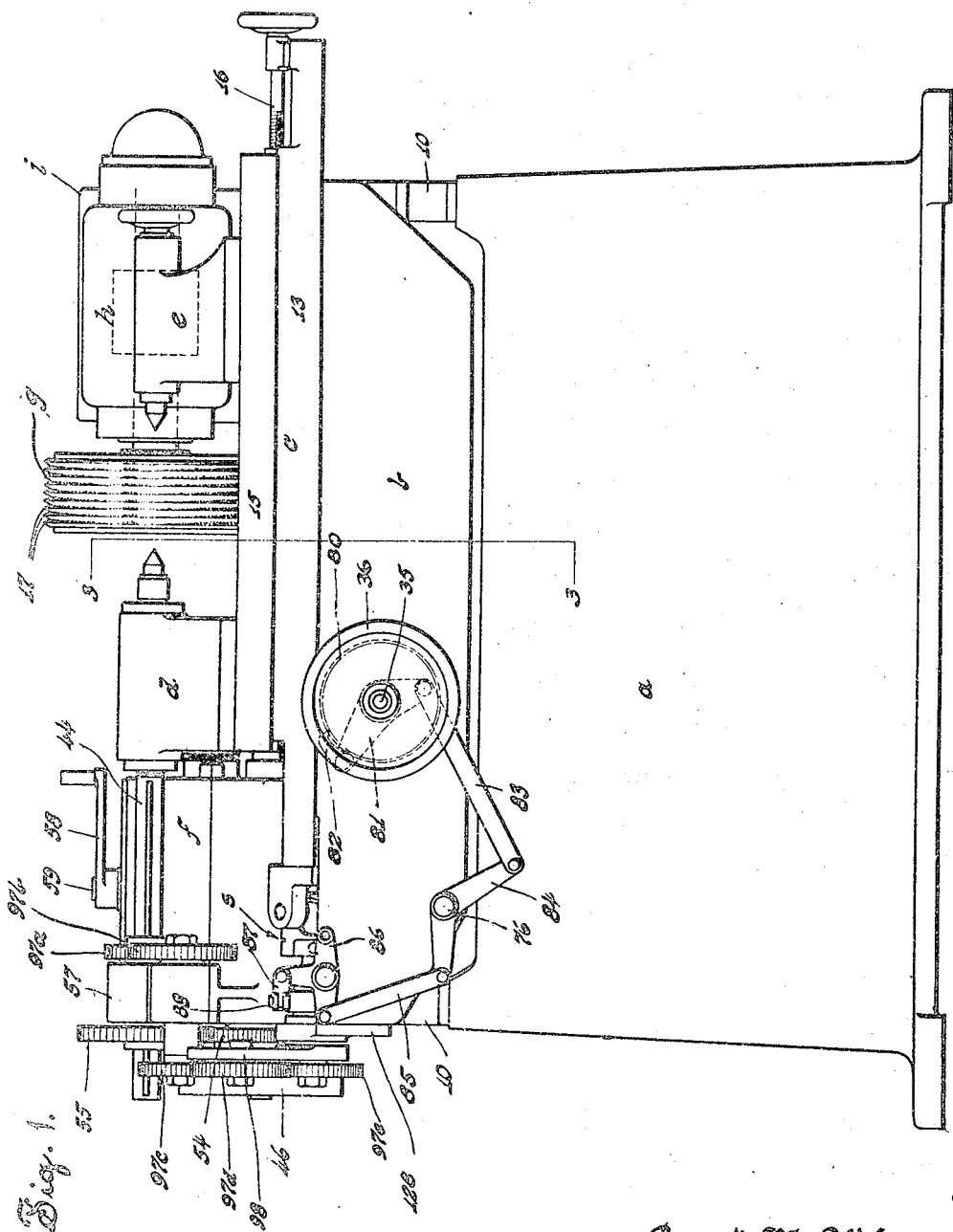
Figure 1 is a front view of the machine.

Referring to the drawings in detail, $a$ denotes a base or fixed bed; $b$, a rocking bed mounted thereon; $c$, a work holder mounted for reciprocation on the rocking bed substantially in parallelism with the axis about which said bed is rocked and having head and tail stocks $d$ and $e$, respectively; $f$, a gear box mounted on the rocking bed; and $g$, the grinding wheel mounted in a suitable bearing box $h$ carried by a slide $i$, the latter being mounted on the base $a$ for adjustment at right angles to the axis of the work.

In the present illustrative disclosure, the rocking bed $b$ is L-shape in plan and is mounted for rocking movement on suitable knife edges 10 positioned at the forward corners of the base $a$. The work holder comprises, generally, a main slide 13 mounted on ways 14 on the longitudinally extending portion of the rocking bed $b$, a supplemental slide 15 mounted on the main slide and adapted to be adjusted thereon by a screw 16, and the head and tail stocks $d$ and $e$ mounted on the supplemental slide 15. The tail stock may be adjustable, if desired.

The grinding wheel $g$ is in the form of a cylindrical member having a plurality of circumferential cutting edges or ribs 17 spaced apart in accordance with the pitch of the thread to be ground. In the present instance, each cutting edge conforms exactly to the configuration and size of the groove of the thread operated upon. Preferably, the serrations or cutting edges of the grinding wheel are so spaced apart that they will grind non-adjacent convolutions of the thread groove so that the heating effect on the work is minimized, and sufficient space is provided between the serrations or cutting edges to permit of the flow of a suitable cooling fluid thereto. In the present illustrative disclosure, wherein it may be assumed that the work has a single thread, the serrations or cutting edges on the wheel are spaced apart at a distance twice the pitch of the thread. Since a plurality of grinding edges or ribs on the wheel are operating simultaneously on the work, the time required to grind the thread and take out all of the imperfections and inaccuracies therein, due to hardening the work or other causes, will be materially reduced, so that the tap or screw can be ground at a lower cost. Where the serrations of the grinding wheel are spaced apart twice the distance of the pitch of the thread, it is necessary to rotate the work about two complete revolutions during the cutting operation and while the work is being moved in accordance with the pitch of the thread in order that the grinding wheel will operate upon the thread throughout its entire length. It is, of course, understood that the serrations of the grinding wheel may be spaced other than at twice the distance of the thread being ground. The grinding wheel may be rotated in any suitable manner, as by means of a belt (not shown) passing about a pulley 18 secured to the grinding wheel spindle. The slide $i$ on which the grinding wheel is mounted may be adjusted radially of the work in any suitable manner, as by means of a hand screw 19.

Figure 3:
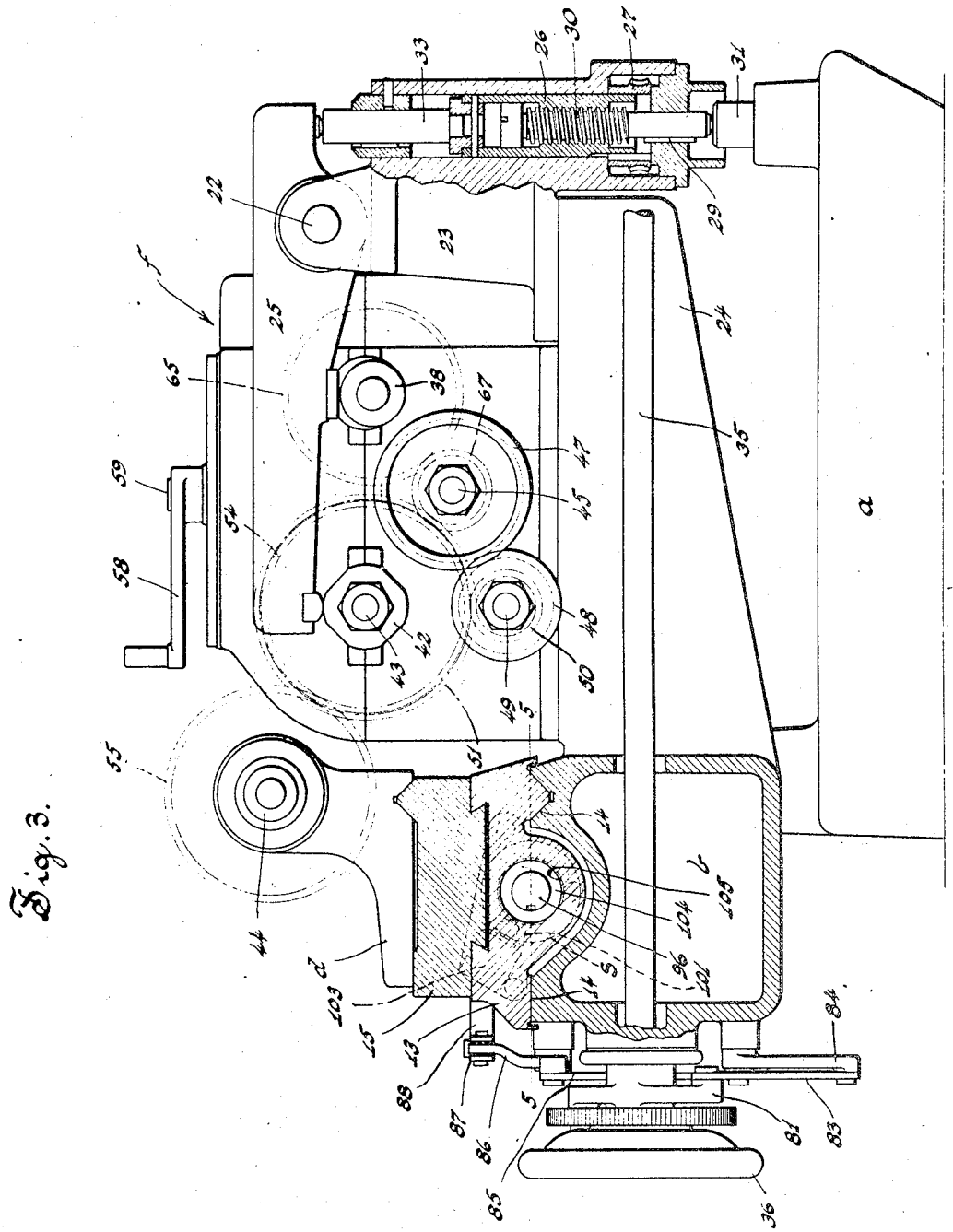
Fig. 3 is a vertical sectional view taken substantially on line 3—3 of Fig. 1 and looking in the direction of the arrow.

Pivoted, as at 22, in a bracket 23 fixed to the rearwardly extending arm or leg 24 of the rocking bed $b$, is a rocking beam 25 through which certain mechanisms or instrumentalities operate to rock the bed and thereby move the work towards and away from the grinding wheel. One of said mechanisms is that for swinging the rocking bed with a succession of small movements so as to feed the work to the wheel, each time a new cut is to be taken. This feeding mechanism includes a nut 26 mounted for sliding movement in a bore within the bracket 23. To the lower end of the nut is keyed a worm wheel 27 which is in mesh with a worm 28. In threaded engagement with the nut 26 and keyed against rotation relative to the bracket 23, as at 29, is a screw 30 having a bearing at its lower end on a block 31 rising from the base $a$. Supported in the upper end of the nut 26 is a pin 33 on which the short end of the rocking beam or lever 25 rests. The worm 28 is carried by a shaft 35 which, as shown most clearly in Fig. 3, extends through the rocking bed to the front of the machine. This shaft may be manually rotated by hand wheel 36 to preliminarily adjust the work radially of the wheel. This shaft is intermittently rotated through mechanism, including the cam S, hereinafter more fully described in detail, for the purpose of swinging the rocking bed a slight distance toward the grinding wheel each time a new cut is to be taken. It is to be understood that when the shaft 35 is rotated the nut 26 is turned so that it will move up or down, as the case may be, on the screw 30 and thereby vary the distace between the upper end of the pin 33 and the lower end of the screw 30.

Another mechanism which cooperates with the rocking beam in order to move the work ries a pivoted pawl 82 cooperating with the ratchet wheel 80. The other end of the lever 81 is connected by a link 83 to one arm of a bell crank 84 fixed to the forward end of the shaft 76. The other arm of the crank is connected by a link 85 to a T-lever 86. One arm of this lever 86 is connected by a link 87 to a shipper lever 88 which carries a roller 89 cooperating with the cam R. When the T-lever 86 is rocked in one direction, in the present instance, clockwise, the lever 81 is rotated in a clockwise direction so that the pawl 82 will rotate the ratchet wheel 80, together with the shaft 35 on which it is fixed, in a direction which will result in the nut 26 of the feed mechanism moving down on the screw 30, whereupon the rocking bed will swing downwardly and rearwardly to a slight extent to feed the work relative to the grinding wheel. When the T-lever 86 is rocked in a counterclockwise direction, the pawl 82 is moved counterclockwise, during which time it will ride over the teeth of the ratchet wheel 80 without imparting rotation thereto. In case a left hand thread is to be ground, the upper end of the link 85 is connected to that arm of the T-lever 86 which extends to the right, referring to Fig. 1.

Figure 5:
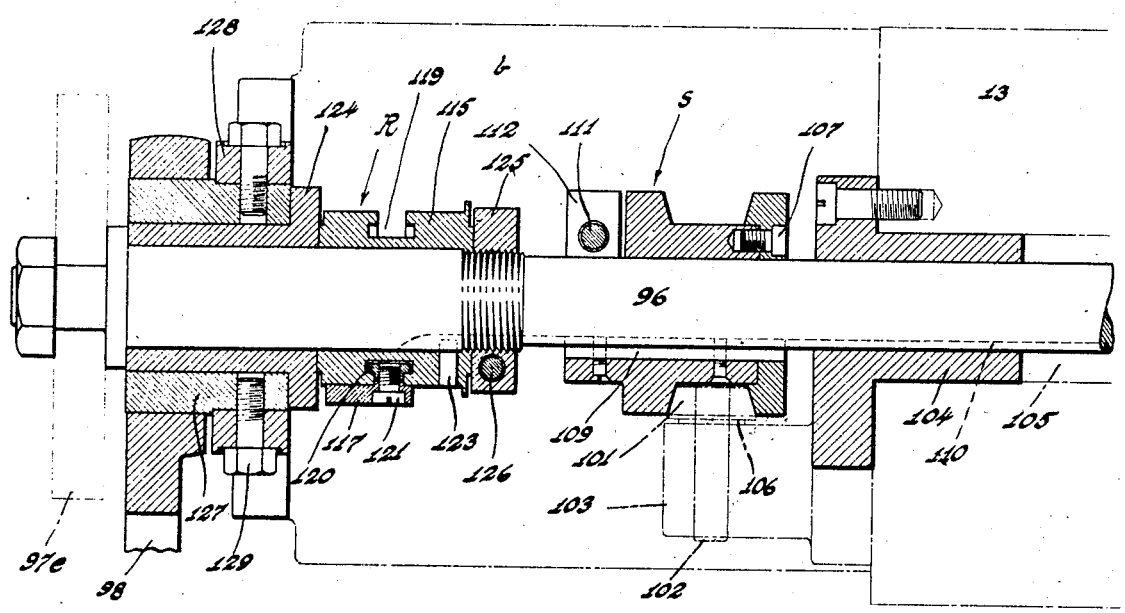
Fig. 5 is a detail view showing in horizontal section the cam for reciprocating the work holder and the cam for controlling the feeding movement of the work to the wheel and the withdrawal movement of the work upon its return stroke. This view is taken on line 5—5 of Fig. 3.
Figure 6:
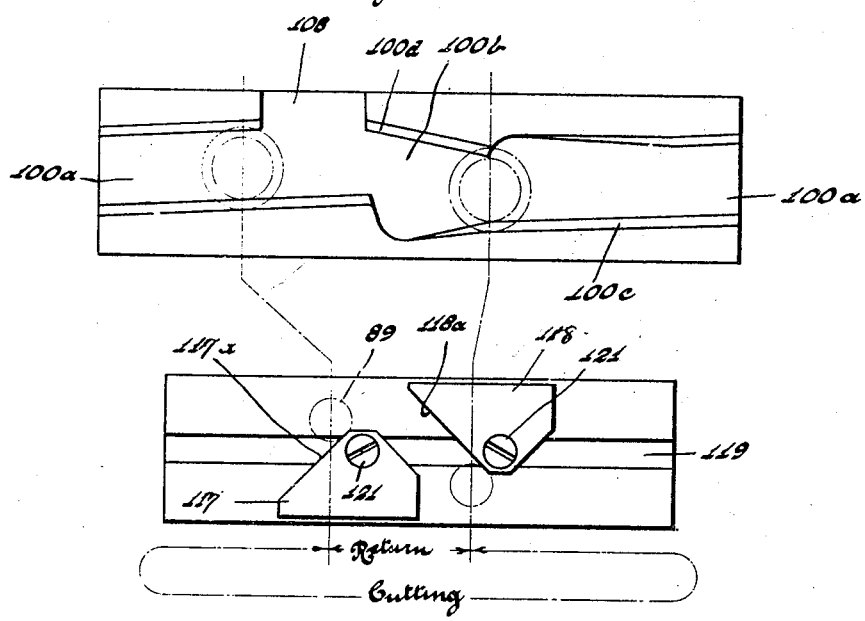
Fig. 6 is a diagrammatic view showing the relation between the cams.

In accordance with the present invention, the cam R is fixed to a shaft 96 which also carries the cam S for moving the work holder on its operative and inoperative strokes. This shaft is driven from the work spindle in a single direction in any suitable manner, as, for instance, through the train of gears $97^a$, $97^b$, etc. The first gear $97^a$ of the train is fixed to the sleeve 56, and the last gear $97^e$ is fixed to the outer end of the shaft 96. The gear $97^d$ is a change gear carried by rocker arm 98. The cam S has a circumferential groove in which engages a roller or follower 101 journalled on a pin 102 driven into a lug 103 extending from a flanged bushing 104 fixed in a bore 105 in the left hand end of the main slide 13 of the work holder. The parts 101, 102 and 103 are shown in dotted lines in Fig. 5 since, in the other figures they are above the plane on which Fig. 5 is taken. The inner end of the shaft 96 has a bearing in this bushing 104 so that the shaft is held against flexure and vibration. The cam groove has a pitch portion $100^a$ and a return portion $100^b$. The cam surface $100^c$ of the pitch portion, and against which surface the follower 101 engages while the cam is moving the work holder on its operative stroke, is so inclined as to move the work axially at a rate corresponding to the pitch of the thread being ground. This cam surface extends more than half way around the cam, it being of such length as to move the work holder axially of the work during the time required to bring the work into engagement with the wheel, to grind the work, and then move the work away from the wheel, and during this time the work spindle is given more than one complete revolution. In the present illustrative disclosure, since it has been assumed that a piece of work having a single thread is operated upon and the grinding wheel has its serrations spaced apart at a distance twice the pitch of the thread, the pitch portion of the cam is of such length that it moves the work holder on its operative stroke while the work is making four complete revolutions. During the first revolution of the work the latter is being brought into engagement with the wheel; during the second and third revolutions, the grinding wheel is operating upon the work, and during the fourth revolution, the work is being moved away from the wheel. The return portion $100^b$ of the cam has a cam surface $100^d$ facing in a direction opposite to the cam surface $100^c$. This cam surface $100^d$ is of such length and so inclined as to return the work holder on its inoperative stroke, preferably while the work is making one complete revolution. The cam surfaces $100^c$ and $100^d$ are so related that when the roller leaves one of these surfaces, it is immediately picked up by the other, so that there is substantially no lost motion. Preferably, the periphery of the roller 101 is bevelled or inclined, in the present instance the roller being frustro-conical, and the cam surfaces $100^c$ and $100^d$ are similarly inclined in the direction of their depths so that the cam surfaces urge and hold the roller against a shoulder 106. For convenience in manufacture, the cam S may be of two parts secured together by screws 107, as shown most clearly in Fig. 5. The cam S is also provided with a groove 108 so that the shaft 96, together with the cams and other parts carried thereby, may be removed, as hereinafter described more in detail. The cam carries a key 109 which slidably engages in a longitudinal groove 110 in the shaft 96. The cam S is secured against longitudinal movement, and in any desired position of adjustment on the shaft 96, by a clamping screw 111 passing through spring fingers or portions 112 of the cam.

The cam R includes a sleeve 115 and dogs 117, 118 adjustably secured thereto. In the present illustrative disclosure, the sleeve has a circumferential T-groove 119 which receives square flanged nuts 120. The dogs are secured to these nuts by bolts 121. The dog 117 has a cam surface $117^a$ which, while the cam S is just completing the operative stroke of the work holder, engages the roller 89 and throws the shipper lever 88 in a direction to so actuate the escapement clutch mechanism that the lifting cam is turned 180° from the position shown in Fig. 3 so as to swing the rocking bed upwardly and forwardly and thus withdraw the work from relatively to the wheel is in the form of a cam 38. This cam is intermittently rotated so as to lift the work away from the grinding wheel on the return stroke of the work holder and to again bring the work into operative position when a new cut is to be taken. As shown most clearly in Fig. 3, it engages the underside of the long arm of the rocking beam 25. The cam is secured to the inner end of a shaft 39 journaled in the gear box $f$, and this shaft is intermittently rotated 180° through suitable mechanism which includes an escapement ratchet clutch controlled by the cam R associated with the cam S, as hereinafter described more in detail.

The third mechanism for rocking the rocking bed includes a pattern cam 42 which may be used when it is desired to cut an irregular circumferential contour on the work as, for instance, when it is desired to relieve the teeth of a tap. In the present illustrative disclosure, this cam has four lobes or rises corresponding to the four lands of a four-fluted tap. It is fixed to the end of a shaft 43 which is geared up to the work spindle 44 so as to rotate in synchronism therewith.

The eccentric cam 38 which, for convenience, will be termed a "lifting cam", the pattern cam 42, and the work spindle 44, are driven through the following arrangement: Journaled in the gear box $f$ is a main shaft 45 to which is fixed a pulley 46 driven by means of a belt (not shown) passing thereabout. On the inner end of the shaft 45 is a gear 47 meshing with a small gear 48 fixed to a stub shaft 49 which carries a gear 50 which drives a clutch gear 51 adapted to be fixed by a clutch 52 to the shaft 43. On the outer end of this latter shaft is a gear 54 meshing with a gear 55 fixed to a sleeve 56 journaled in a bearing 57. Extending through the sleeve 56 for sliding movement, but splined thereto so as to rotate therewith, is a work spindle 44. The pattern cam 42, which, as stated, is fixed to the shaft 43, and the work spindle 44 are each continuously driven in a single direction. To stop the machine, the handle 58 may be thrown into "off" position. This handle is fixed on a pin 59 which carries, within the gear box, a shipper lever 60 having a roller engaging in a groove of a sleeve 61 splined on the shaft 43 and associated with the clutch 52. This clutch is shown diagrammatically, as it may be of any suitable construction, it being sufficient to say that when the sleeve 61 is moved in one direction the clutch is thrown out, and when moved in the other direction it is thrown in.

Figure 2:
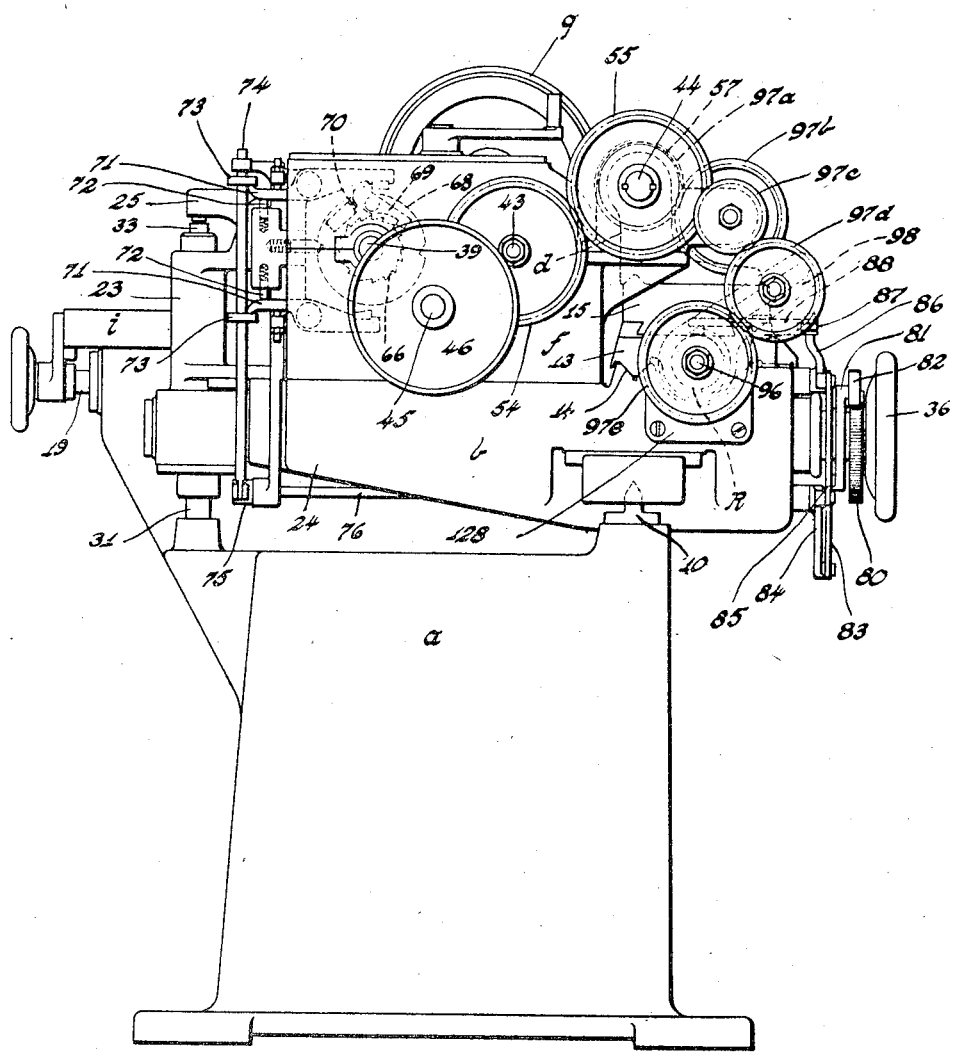
Fig. 2 is a left hand end view thereof.
Figure 4:
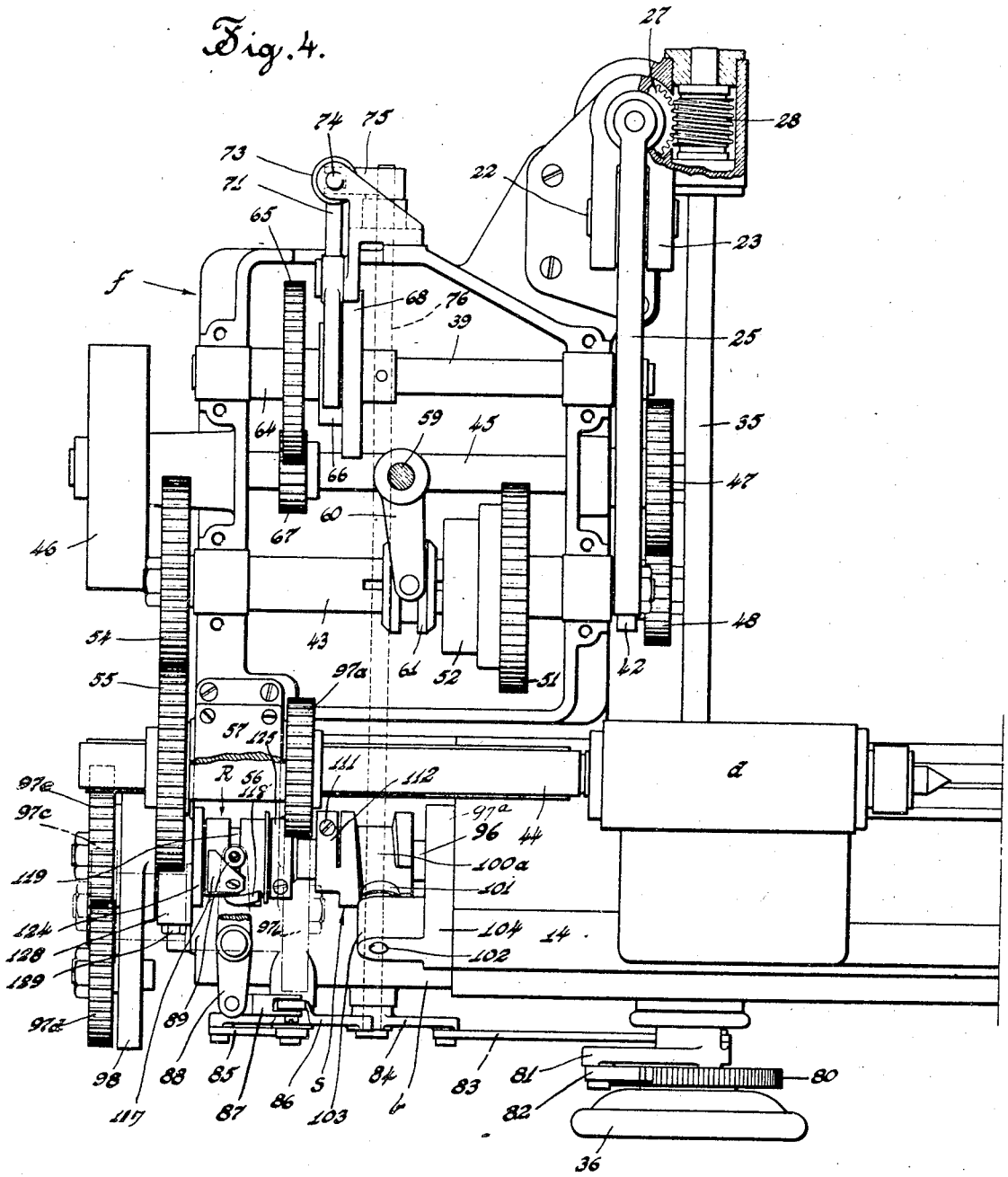
Fig. 4 is a plan view of the left hand side of the machine, some parts being in section and other parts being removed for purposes of clearness.

The shaft 39, on which the lifting cam 38 is fixed, is intermittently rotated through an escapement clutch shown in plan in Fig. 4, and in elevation and by dotted lines in Fig. 2. Normally loose on the shaft 39 is a unit including a sleeve 64, a gear 65, and a ratchet wheel 66. The gear 65, together with the sleeve 64 and the ratchet wheel 66, are continuously driven by a gear 67 fixed on the main shaft 45. Fixed to the shaft 39 is a disk 68 to one face of which is pivoted a pawl 69 which is normally urged into engagement with the teeth of the ratchet wheel 66 by a spring pressed plunger 70. Intermittent engagement of the pawl with the ratchet wheel is controlled by an escapement mechanism which includes a pair of pivoted levers 71, the inner ends of which are diametrically disposed relative to the ratchet wheel 66. The outer ends of these escapement levers are, by means of spring pressed plungers 72, maintained against opposed abutments 73 upon a vertically movable rod 74 connected at its lower end to a lever 75 fixed on a shaft 76 which extends through the rocking bed to the front of the machine. This shaft 76 is controlled by means of the cam R which also automatically controls the operation of the variable connection by means of which the work is fed towards the grinding wheel each time a new cut is to be taken. When this cam R rocks or rotates the shaft 76 in one direction, the rod 74 is lowered, whereupon the upper escapement lever 71 is moved in a direction to release the pawl 69 and the lower lever is moved into the path of movement of this pawl. The pawl, thus released, will engage the continuously rotating ratchet wheel 66 so that the shaft 39 and the ratchet wheel will rotate in unison. This rotary movement of the shaft 39 is limited to 180° because when the pawl has rotated to that extent it is disengaged from the ratchet wheel by the lower lever 71. When the shaft is thus rotated 180°, it may be assumed that the cam 38 fixed thereto raises the long end of the lever of the rocking beam 25, which means that the rocking bed will be swung in a direction to move the work away from the grinding wheel. When the shaft 76 is rotated in the other direction, the lower escapement lever 71 is moved out of engagement with the pawl 69, whereupon the shaft 39 will be rotated another 180°, and during this time the cam 38 will be rotated to the position shown in Fig. 3, thus permitting the long end of the rocking beam to come down, which means that the rocking bed is moved in a direction to bring the work into operative relation to the grinding wheel. It is, of course, understood, that this escapement ratchet clutch mechanism is shown by way of illustration only and the construction may be varied as desired.

On the forward end of the shaft 35, which is connected to the feed mechanism including the nut 26, is a ratchet wheel 80 and a pivoted lever 81. One end of this lever carthe grinding wheel. Also, when the shipper lever 88 is thus turned, the pawl 82 is moved in that direction (clockwise) in which it will ride over the teeth of the ratchet wheel 80 without turning the feed shaft 35. The dog 118 has a cam surface 118ª which, while the cam S is beginning the operative stroke of the work holder, throws the lever 88 in a direction to cause the pawl 82 to rotate the feed shaft 35 and also to cause actuation of the escapement clutch mechanism, whereupon the lifting cam will be rotated 180° to the position shown in Fig. 3. Thus, when the cam surface 118ª is actuating the lever 88, the feed mechanism is actuated to feed the work slightly towards the wheel, and the lifting cam is turned to swing the rocking bed downwardly and rearwardly to bring the work into operative position relative to the wheel. The cam R is splined to the shaft 96 by a key 123 extending into the groove 110 in the shaft 96. The cam R is clamped against longitudinal movement on the shaft 96 between a bushing 124 and a nut 125, the latter being locked in place by a clamping screw 126. The bushing 124, through which the shaft 96 extends, is journalled in a sleeve 127 secured in a bracket 128 by bolts or screws 129. The bracket 128 is secured to the left hand end of the rocking bed b. Secured to the outer end of the sleeve 127 is the rocker arm 98 which carries the change gear 97ᵈ.

To set up the machine, so as to operate upon a new job, the bolts 129 are removed, and the entire assembly, including the shaft 96, the cams R and S, the bushing 124, sleeve 127, rocker arm 98, the change gear thereon, and the gear 97ᵉ, is removed as a unit. Before removing this unit, the shaft 96 is first rotated so as to bring the roller 101 into registry or alinement with the groove 108 in the cam S. A selected cam S, the cam surface of which will depend upon the pitch of the thread to be ground, the number of threads on the work, and the number of serrations on the grinding wheel, is now selected and slipped into place on the shaft 96. The proper change gear is secured to the rocker arm 98. The assembly is then slipped into place with the shaft 96 sliding through the bearing 104 and the sleeve 127 within the bracket 128. The bolts 129 are then screwed home. When thus positioning the assembly in place, the groove 108 will accommodate the roller 101. The dogs 117 and 118 are properly adjusted, and the cam S is clamped to the shaft 96. Assuming that the machine has been thrown into operation and the work holder is completing its operative stroke, the cam surface 117ª will engage the roller on the shipper lever 88 and, through the connections described, will move the pawl 82 in that direction in which it will ride over the teeth of the ratchet wheel 80. Also, when this lever is thus thrown, the upper escapement lever 71 will be released from the pawl 69 whereupon the lifting cam 38 will be rotated 180° from the position shown in Fig. 3, and when this cam is so rotated, it will swing the rocking bed upwardly and forwardly so as to withdraw the work from the grinding wheel. The cam surface 100ᵈ of the cam S will now come into play to move the work on its return or inoperative stroke. After the work has been moved on its inoperative stroke, it is again started forward by the cam surface 100ᵉ on its operative stroke, at which time the cam surface 118ª will come into play and throw the lever 88 in a direction to cause the pawl 82 to rotate the ratchet wheel 80, which, acting through the feed mechanism, will swing the rocking bed slightly downwardly and rearwardly so as to feed the work a slight distance towards the wheel. About this time, the escapement ratchet clutch mechanism is again operated so that the lifting cam 38 will rotate 180° to the position shown in Fig. 3, thus permitting the rocking bed to swing downwardly and rearwardly and bring the work into operative relation to the grinding wheel. While the work is being brought into engagement with the grinding wheel, as just described, the work is making one revolution and it is being moved by the cam S is accordance with the pitch on the work. The cam S will continue to move the work holder in accordance with the pitch of the thread while the work is making two more revolutions, and during this time the grinding wheel is operating on the work. The cam S continues to move the work in accordance with the pitch of the thread thereon during the time that the work is moved out of engagement with the wheel, and then the return portion of the cam S, while the work is making another revolution, will return the work to its original point. This sequence of operations is repeated until the threaded member has been brought down to desired size.

It will be noted that the work spindle and the cam shaft 96 are always rotated in the same direction so that there is no backlash or lost motion between the parts, and this makes for smoothness in operation and accuracy in the final production. The cam R which is in synchronism with the cam S and the work spindle, controls the feeding mechanism and the lifting cam with precision, assuring that the parts operate in the proper timed relation.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:—

1. In a thread grinding machine, a grinding wheel having a plurality of circumferential grinding edges or serrations, means for rotating said wheel, a work holder including a work spindle and mounted for movement axially of the spindle, a rotary shaft; a cam thereon connected to said work holder and having a cam portion for moving said holder on its operative stroke in accordance with the pitch of the thread operated upon and a cam portion for returning said work holder on its inoperative stroke; means for rotating said work spindle, and gearing between said work spindle and shaft whereby said cam makes one revolution in moving said work holder on its operative and inoperative strokes while said work spindle is rotating more than one revolution.

2. In a thread grinding machine, a grinding wheel having a plurality of circumferential grinding edges or serrations, means for rotating said wheel, a work holder including a work spindle and mounted for movement axially of said work spindle, means for rotating said work spindle continuously in the same direction, a rotary shaft, a cam thereon having cam surfaces adapted, upon one complete revolution of said cam to move said work holder on its operative and inoperative strokes, and a driving connection between said work spindle and shaft through which said cam is rotated one complete revolution while said work spindle is rotating more than two revolutions.

3. In a thread grinding machine, a grinding wheel having a plurality of circumferential grinding edges or serrations, means for rotating said wheel, a work holder including a work spindle, means for moving said work holder radially of the wheel so as to move the work into and out of operative position relative to the wheel, a rotary cam for moving said work holder back and forth axially of the work spindle upon one complete revolution of said cam, means for driving said work spindle in a single direction, and a driving connection between said work spindle and cam for driving the latter in a single direction; said cam having a pitch portion for moving said work holder on its operative stroke in accordance with the pitch of the thread operated upon while the work is moved radially towards the wheel during the grinding operation and while the work is being withdrawn from the grinding wheel, and during which time said work rotates more than one revolution, said cam having a return portion for moving said work holder on its inoperative stroke.

4. In a thread grinding machine, a grinding wheel having a plurality of circumferential serrations or cutting edges, means for rotating the same, a work holder including a work spindle, said work holder being mounted for movement towards and away from said wheel and back and forth axially of said spindle, automatically operated means for moving said work holder towards and away from said wheel, a rotary cam having a pitch portion for moving said work holder on its operative stroke in accordance with the pitch of the thread operated upon and a return portion for moving the work holder on its inoperative stroke, a cam for controlling said automatically operated means, means for driving said work spindle in a single direction, and a driving connection between said spindle and cams whereby said cams on one complete revolution move said work holder through one complete cycle while said work spindle is making more than one revolution.

5. In a machine of the character described, a grinding wheel having a plurality of circumferential grinding edges or serrations spaced apart in accordance with the pitch of the thread on the work, a work holder including a spindle, said work holder being mounted for movement towards and away from the grinding wheel and back and forth axially of the work spindle, a rotary cam having a pitch portion adapted to move said work spindle on its operative stroke in accordance with the pitch of the thread to be ground and having a return portion for quickly moving said work holder on its inoperative stroke, a second cam for effecting radial movement of the work holder towards said wheel upon the beginning of the operative stroke of said work holder and away from the wheel towards the end of the operative stroke of said work holder, means for driving said work spindle in a single direction, and a positive driving connection between said spindle and cams.

6. In a thread grinding machine, a grinding wheel having a plurality of circumferential grinding edges, means for rotating said wheel, a work holder including a work spindle and mounted for movement towards and away from said wheel and back and forth axially of the work spindle, feeding means for moving the work holder towards the wheel each time a new cut is to be taken, mechanism for moving said work holder into and out of operative relation to said wheel, a rotary cam controlling said feeding means and said mechanism, a rotary cam adapted, on one complete revolution, to move said work holder on its operative stroke in accordance with the pitch of the thread to be ground and then on its return stroke, and a driving connection between said work spindle and cams.

7. In a thread grinding machine, a grinding wheel having a plurality of circumferential grinding edges, means for rotating said wheel, a work holder including a work spindle and mounted for movement towards and away from said wheel and back and forth axially of the work spindle, feeding means for moving the work holder towards the wheel each time a new cut is to be taken, mechanism for moving said work holder into and out of operative relation to said wheel, and including an engagement ratchet clutch, a rotary shaft, a cam therein having a pitch portion adapted to move said work holder on its operative stroke in accordance with the pitch of the thread to be ground and having a return portion for quickly moving the work holder on its inoperative stroke, a second cam on said shaft for controlling said feeding means and mechanism, and gearing between said spindle and shaft whereby said cams make one revolution while said spindle makes a plurality of revolutions.

8. In a thread grinding machine, a fixed bed, a grinding wheel thereon having a plurality of circumferential grinding serrations a rocking bed on said fixed bed, a work holder slidably mounted on said rocking bed and including a work spindle, means for driving said work spindle, means for rocking said rocking bed to move the work radially of said wheel; a cam connected to said work holder and having a pitch portion adapted to move said work holder on its operative stroke in accordance with the pitch of the thread operated upon, and a return portion for moving said work holder on its inoperative stroke; and a driving connection between said work spindle and cam.

9. In a thread grinding machine, a fixed bed, a grinding wheel thereon having a plurality of circumferential grinding serrations, a rocking bed on said fixed bed, a work holder slidably mounted on said rocking bed and including a work spindle, means for rotating said work spindle in a single direction, means for rocking the rocking bed to move the work radially of said wheel, a cam connected to said work holder and having cam surfaces adapted upon one complete revolution of said cam to move said work holder on its operative stroke in accordance with the pitch of the thread operated upon and then on its inoperative stroke, and a driving connection between said work spindle and cam through which said cam is rotated one complete revolution while said work spindle is making more than two revolutions.

10. In a thread grinding machine, a fixed bed, a grinding wheel thereon having a plurality of circumferential grinding serrations, a rocking bed on said fixed bed, a work holder slidably mounted on said rocking bed and including a work spindle, means for rotating said work spindle in a single direction, feeding means for swinging the rocking bed towards said wheel each time a new cut is to be taken, a shaft, a cam thereon connected to said work holder and having a pitch portion adapted to move said work holder on its operative stroke in accordance with the pitch of the thread operated upon, and a return portion for quickly moving said work holder on its inoperative stroke, and a driving connection between said spindle and shaft.

11. In a thread grinding machine, a fixed bed, a grinding wheel thereon having a plurality of grinding serrations, a rocking bed, a work holder slidably mounted on said rocking bed and including a work spindle, means for rotating said work spindle, means for rocking said rocking bed towards the wheel to feed the work each time a new cut is to be taken, means for rocking said rocking bed towards and away from the grinding wheel so that the work will clear the wheel on the reverse stroke of the work, a cam connected to said work holder, and a driving connection between said work spindle and cam for driving the latter in a single direction, said cam having a pitch portion for moving said work holder on its operative stroke in accordance with the pitch of the thread operated upon while the work is moved radially towards the wheel, during the grinding operation and while the work is withdrawn from the wheel, and during which time said work rotates more than one revolution, said cam having a return portion for quickly moving said work holder on its inoperative stroke.

12. In a thread grinding machine, a fixed bed, a grinding wheel thereon having a plurality of grinding serrations, a rocking bed, a work holder slidably mounted on said rocking bed and including a work spindle, means for rotating said work spindle, a rocking beam pivoted to said rocking bed, means cooperating with said rocking beam for rocking said rocking bed towards the wheel to feed the work each time a new cut is to be taken, means cooperating with said rocking beam for rocking said rocking bed towards and away from the grinding wheel so that the work will clear the wheel on the reverse stroke of the work, a cam connected to said work holder, and a driving connection between said work spindle and cam for driving the latter in a single direction, said cam having a pitch portion for moving said work holder on its operative stroke in accordance with the pitch of the thread operated upon while the work is moved radially towards the wheel, during the grinding operation and while the work is withdrawn from the wheel, and during which time said work rotates more than one revolution, said cam having a return portion for quickly moving said work holder on its inoperative stroke.

13. In a thread grinding machine, a fixed bed, a grinding wheel thereon having a plurality of grinding serrations, a rocking bed on said fixed bed, a work holder slidably mounted on said rocking bed and including a work spindle, means for rotating said work spindle, means for rocking said rocking bed to move the work radially on said wheel; a cam connected to said work holder and having a pitch portion for moving said holder on its operative stroke in accordance with the pitch of the thread operated upon, and a cam portion for returning said work holder on its inoperative stroke; a cam associated with said first cam for controlling said rocking means, and a driving connection between said spindle and said cams whereby said cams make one complete revolution to move said work holder through one complete cycle while said spindle is making more than one revolution.

14. In a thread grinding machine, a fixed bed, a grinding wheel thereon having a plurality of grinding serrations, a rocking bed on said fixed bed, a work holder slidably mounted on said rocking bed and including a work spindle, means for rotating said work spindle in a single direction, a cam shaft, a cam thereon connected to said work holder and having a pitch portion for moving said work holder on its operative stroke in accordance with the pitch of the thread operated upon, and a return portion for moving said work holder on its inoperative stroke; automatically operated means for swinging said rocking bed in a direction to move the work towards the wheel each time a new cut is to be taken, a second cam on said shaft controlling said last mentioned means, and a driving connection between said work spindle and shaft.

15. In a thread grinding machine, a fixed bed, a grinding wheel thereon having a plurality of grinding serrations, a rocking bed on said fixed bed, a work holder slidably mounted on said rocking bed and including a work spindle, means for rotating said work spindle, mechanism for rocking said bed to bring the work into operative position to the grinding wheel and away from the wheel so that the work will clear the wheel on the return stroke of the work holder, means for swinging the bed in a direction to feed the work towards the wheel each time a new cut is to be taken, a cam for controlling said mechanism and feeding means, a second cam adapted upon one complete revolution to move said work holder on its operative stroke and then return it on its inoperative stroke, and a driving connection between said work spindle and cams.

16. In a machine of the character described, a slidable work holder including a spindle, means for rotating said spindle, a rotary shaft, a cam on said shaft, a conical roller engaging said cam and journaled on said work holder with its axis at right angles to said shaft, and a shoulder on said work holder against which said roller abuts; the cam surfaces on said cam being inclined corresponding to the periphery of said roller whereby to force and hold the latter against said abutment.

17. In a machine of the character described, a bed, a work holder supported for sliding movement thereon and including a work spindle, a cam shaft having a bearing in said bed, a driving connection between said spindle and said shaft, a cam on said shaft having a peripheral cam groove and a follower on said work holder engaging in said groove, said shaft and cam being slidably removable from place, said cam having a groove extending from said first groove to the edge of the cam to accommodate said follower upon removal of said shaft and cam.

18. In a machine of the character described, a bed, a work holder slidably mounted thereon including a work spindle, a bearing in said bed, a sleeve removably and rotatably positioned in said bearing, a shaft extending through said sleeve, gearing on the outer end of said shaft, a cam on said shaft connected to said work holder for moving the same back and forth axially of said spindle; said shaft, sleeve, gearing and cam being removable as a unit, and means for detachably securing said sleeve in position.

19. In a machine of the character described, a bed, a work holder slidably mounted thereon and including a work spindle, mechanism for moving said work holder radially of said spindle, a bearing in said bed, a sleeve removably and rotatably positioned in said bearing, a shaft extending through said sleeve and having a sliding bearing in said work holder, a cam on said shaft and controlling said mechanism, a second cam adjustably fixed to said shaft and connected to said work holder for moving the same axially of said spindle, and means for removably securing said sleeve in place.

20. In a machine for grinding threaded members, means for rotatably supporting the member to be ground, an abrasive grinding wheel having a plurality of similar circumferential serrations spaced apart to operate upon the convolutions of the thread on the work, means for rotatably supporting said grinding wheel, means for repeatedly effecting a back and forth movement between the grinding wheel and work axially of the latter in accordance with the pitch of the thread and through a distance less than the effective grinding length of said wheel, and means for intermittently effecting a relative feeding movement of the grinding wheel and work towards each other.

21. In a machine for grinding threaded members, means for rotatably supporting the member to be ground, an abrasive grinding wheel supported for rotation and having a plurality of similar circumferential serrations spaced apart to operate upon the convolutions of the thread and corresponding in cross section to the shape of that thread, means for repeatedly effecting a relative reciprocating movement between the grinding wheel and work axially of the latter in accordance with the pitch of the thread and through a distance substantially equal to that between adjacent serrations of the grinding wheel, means for effecting a relative movement between the grinding wheel and work towards and away from each other to bring the same into engagement on the operative stroke and separate the same on the inoperative stroke, and means for intermittently effecting a feeding movement between the grinding wheel and work.

22. In a machine for grinding threaded members, means for rotatably supporting the member to be ground, an abrasive grinding wheel having a plurality of similar circumferential serrations spaced apart to operate upon the convolutions of the thread on the work, means for rotatably supporting said grinding wheel, a cam for repeatedly effecting a back and forth movement between the grinding wheel and work axially of the latter in accordance with the pitch of the thread and through a distance less than the effective grinding length of said wheel, and a cam for intermittently effecting a relative feeding movement of the grinding wheel and work towards each other.

23. In a machine for grinding threaded members, a holder for rotatably supporting the member to be ground, a grinding wheel having a plurality of similar circumferential serrations spaced apart to simultaneously operate upon the convolutions of the thread operated upon, means for rotatably supporting said wheel, means for repeatedly moving said work holder back and forth axially of the work, the work during each cutting stroke being moved in accordance with the pitch of the thread operated upon and through a distance less than the effective grinding length of said wheel, and means for moving said work holder towards said wheel upon each operative stroke of said holder to bring the work into position for a new cut.

24. The method of grinding threaded members which consists in rotatably supporting the member to be operated upon, rotatably supporting a grinding wheel having a plurality of similar circumferential serrations spaced apart to operate upon the convolutions of the thread of the work, repeatedly moving the grinding wheel and work one relative to the other axially of the work in accordance with the pitch of the thread and through a distance less than the effective grinding length of the wheel, and intermittently feeding the grinding wheel and work relatively one towards the other.

25. The method of grinding threaded members which consists in rotatably supporting the member to be operated upon, rotatably supporting a grinding wheel having a plurality of similar circumferential serrations spaced apart to operate upon non-adjacent convolutions of the thread of the work, repeatedly moving the grinding wheel and work one relative to the other axially of the work in accordance with the pitch of the thread and substantially through a distance equal that between adjacent serrations of the wheel, and intermittently feeding the wheel and work relatively one towards the other.

26. In a machine for grinding threaded members, an abrasive grinding wheel supported for rotation and having a plurality of circumferential serrations spaced apart to operate upon the convolutions of the thread and corresponding generally in cross section to the shape of that thread, means for repeatedly effecting a relative back and forth movement between the grinding wheel and work axially of the latter in accordance with the pitch of the thread and through a distance substantially equal to that between adjacent serrations of the grinding wheel, means for rotating the work a plurality of revolutions during the operative stroke through said distance, and means for intermittently effecting a relative feeding movement of the grinding wheel and work towards each other.

27. The method of grinding threaded members which consists in rotatably supporting the member to be operated upon, rotatably supporting a grinding wheel having a plurality of similar circumferential serrations spaced apart to operate upon the convolutions of the thread, repeatedly moving the grinding wheel and work one relative to the other axially of the work on an operative stroke and then on an inoperative stroke, such relative movement being on the operative stroke of the work and while the wheel is in engagement with the thread through a distance substantially equal that between adjacent convolutions and while the work is making a plurality of revolutions, and intermittently feeding the grinding wheel and work relatively one towards the other.

28. A tap grinding machine comprising in combination, a base, a pivotally mounted member thereon, work supporting and rotating means on said pivotally mounted member, a support, a wheel rotatably mounted thereon, cam means to effect relative axial movement between said wheel and the work supporting means, means to actuate said cam means from said work rotating means, and means to oscillate said pivotally mounted member in timed relation to said movements to engage and disengage the work relative to the wheel.

29. A tap grinding machine comprising in combination, a base, a pivotally mounted member thereon, work supporting and rotating means on said pivotally mounted member, a support having a rotatable wheel mounted thereon movable toward and from the work supporting means, a cam rotatably mounted in said pivotally mounted member, means on said work supporting member engaging said cam whereby the work supporting means is moved axially relative to the wheel, cam means to oscillate said pivotally mounted member, and means to control the oscillatory movement of the pivotally mounted member relative to the axial movements of the work rotating means.

30. A tap grinding machine comprising in combination, a base, a pivotally mounted member thereon, work supporting and rotating means on said pivotally mounted member, a support having a rotatable wheel mounted thereon movable toward and from the work supporting means, a cam rotatably mounted in said pivotally mounted member, means on said work supporting member engaging said cam whereby the work supporting means is moved axially relative to the wheel, cam means to oscillate said pivotally mounted member, means to control the oscillatory movement of the pivotally mounted member in timed relation to the axial movements of the work rotating means, and means to actuate said first mentioned cam from said work rotating means.

31. A tap grinding machine comprising in combination, a base, a pivotally mounted member thereon, work supporting and rotating means on said pivotally mounted member, a support, a wheel rotatably mounted thereon, cam means to effect relative axial movement between said wheel and the work supporting means, means to oscillate said pivotally mounted member in timed relation to said axial movements to engage and disengage the work relative to the wheel, and supplementary oscillating means for said pivotally mounted member adapted to oscillate said pivotally mounted member a plurality of times during each rotation of the work while the table is moving in one direction.

32. A tap grinding machine comprising in combination, a base, a pivotally mounted member thereon, work supporting and rotating means on said pivotally mounted member, a support, a wheel rotatably mounted thereon, cam means to effect relative axial movement between said wheel and the work supporting means, means to actuate said cam means from said work rotating means, means to oscillate said pivotally mounted member in timed relation to said movements to engage and disengage the work relative to the wheel, and supplementary oscillating means for said pivotally mounted member adapted to oscillate said pivotally mounted member a plurality of times during each rotation of the work while the table is moving in one direction.

33. A tap grinding machine comprising in combination, a base, a pivotally mounted member thereon, work supporting and rotating means on said pivotally mounted member, a support having a rotatable wheel mounted thereon movable toward and from the work supporting means, a cam rotatably mounted in said pivotally mounted member, means on said work supporting member engaging said cam whereby the work supporting means is moved axially relative to the wheel, cam means to oscillate said pivotally mounted member, means to control the oscillatory movement of the pivotally mounted member relative to the axial movements of the work rotating means, and a supplementary cam driven by said work rotating means adapted to oscillate the pivotally mounted member a plurality of times during each rotation of the work while the table is moving in one direction.

34. A tap grinding machine comprising in combination, a base, a pivotally mounted member thereon, work supporting and rotating means on said pivotally mounted member, a support having a rotatable wheel mounted thereon movable toward and from the work supporting means, a cam rotatably mounted in said pivotally mounted member, means on said work supporting member engaging said cam whereby the work supporting means is moved axially relative to the wheel, cam means to oscillate said pivotally mounted member, means to control the oscillatory movement of the pivotally mounted member in timed relation to the axial movements of the work rotating means, means to actuate said first mentioned cam from said work rotating means, and a supplementary cam driven by said work rotating means adapted to oscillate the pivotally mounted member a plurality of times during each rotation of the work while the table is moving in one direction.

35. A tap grinding machine comprising in combination, a base, a pivotally mounted member thereon, work supporting and rotating means on said pivotally mounted member, a support having a rotatable wheel thereon movable toward and from the work supporting means, a cam rotatably mounted in said pivotally mounted member, means on said work supporting member engaging said cam whereby the work supporting means is moved axially relative to the wheel, cam means to oscillate said pivotally mounted member, and means to actuate the cam means for the oscillatory movement of the pivotally mounted member at the ends of the table movement in each direction, means to actuate said first mentioned cam from said work rotating means, and a supplementary cam driven by said work rotating means adapted to oscillate the pivotally mounted member a plurality of times during each rotation of the work while the table is moving in one direction.

BENGT M. W. HANSON.